J. CLARRIDGE.
Cultivator.
No. 58,597. Patented Oct. 9, 1866.
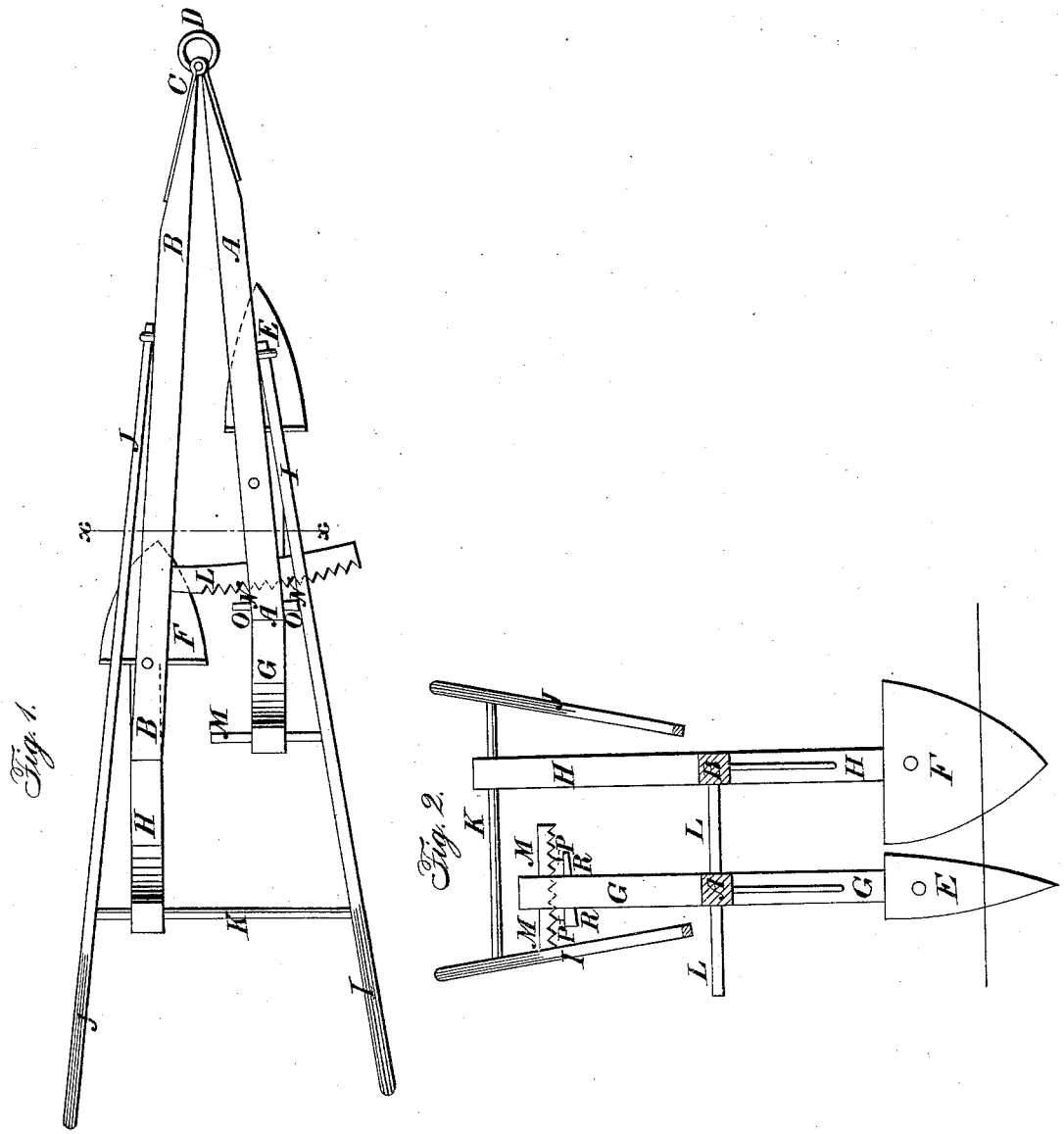

UNITED STATES PATENT OFFICE.

JOHN CLARRIDGE, OF PANCOASTBURG, OHIO.

IMPROVEMENT IN DOUBLE-SHOVEL PLOWS.

Specification forming part of Letters Patent No. 58,597, dated October 9, 1866.

*To all whom it may concern:*

Be it known that I, JOHN CLARRIDGE, of Pancoastburg, in the county of Fayette and State of Ohio, have invented a new and useful Improvement in Double-Shovel Plows; and I do hereby declare that the following is a full, clear, and exact description thereof, which will enable others skilled in the art to make and use the same, reference being had to the accompanying drawings, forming part of this specification, in which—

Figure 1 is a top view of my improved plow. Fig. 2 is a detail sectional view of the same, taken through the line $x\ x$, Fig. 1.

Similar letters of reference indicate like parts.

My invention has for its object to furnish an improved double-shovel plow so constructed and arranged that by occasionally changing one of the shovels the same plow may be used for cultivating the corn through the whole season; and it consists, first, in the combination and arrangement of the circular toothed arms, toothed blocks, and keys or wedges with the beams, plow-heads, and handles, for the purpose of spreading the beams farther apart to adjust them to the different-sized plows required for cultivating the corn at different stages of its growth; and, second, in attaching the shovel to the plow-head in such a way that it may be removed and replaced with a shovel of a different size, according to the requirements of the work to be done, as hereinafter more fully described.

A and B are the beams of the plow, which are hinged to each other at their forward ends, as shown at C, Fig. 1, so that their rear ends, and consequently the shovels, may be placed at a greater or less distance apart, as may be required. The clevis by means of which the horse is connected to the plow may be attached directly to the hinge C, or connected to said hinge by a ring, D, as may be desired.

The beam A is made shorter than the beam B, so that the shovel E, which works nearer to the corn, may be in advance of the shovel F, as seen in Fig. 1.

The plow-heads G and H are attached to the rear ends of the beams A and B in the usual manner, and their upper ends are of different heights, as shown in Figs. 1 and 2.

I and J are the handles, the lower ends of which are attached to the beams A and B, as shown in Fig. 1, and their upper ends are connected to each other by a cross-bar, K, which also passes through and secures the upper end of the plow-head H, as shown in Fig. 1.

The beam A and plow-head G are held securely in any desired position by means of the circular arms L and M, which are arcs of circles having for their centers the pivoting-point of the hinge C.

One end of the arm L is securely attached to the beam B, and the other end passes through a slot in the beam A, and it has teeth formed upon its rear edge, as shown in Fig. 1.

N is a block fitting into the slot through the beam A in the rear of the arm L, and having teeth formed upon its forward side, which fit into the teeth of the arm L.

O is a wedge driven into the slot through the beam A in the rear of the block N, and keying the block N and arm L securely in place.

One end of the arm M is secured to the handle I, and the other end passes through a slot formed in the upper end of the plow-head G. It has teeth formed upon its lower edge, and is secured in place by the toothed block P and wedge R, in the manner already described.

The shovel F is securely attached to the lower end of the plow-head H; but the shovel E is attached to the plow-head G in such a way that it can be removed when desired and replaced with a shovel of a different size, as may be required, according to the work to be done.

In using the plow, when the corn is small, a narrow or bull-tongue shovel, E, is first placed upon the plow-head G, and the beams A and B so adjusted that the shovel F will throw dirt into and fill up the furrow made by the shovel E. The plow is then guided so that the shovel E may pass close to the corn, cutting up and covering with earth the weeds that have sprung up with the corn. For the next plowing the shovel E is replaced with another, about the size of the shovel F, and the beams so adjusted that the shovel F will nearly fill up the furrow made by the forward shovel. The plow this time must be guided a little farther from the corn.

For the third or last plowing a shovel larger than the shovel F should be placed upon the plow-head G, and the beams A and B so adjusted that the shovel F will about half fill up the furrow made by the forward shovel, and the plow should be so guided as to throw sufficient earth around the corn-stalks to support them.

I claim as new and desire to secure by Letters Patent—

The combination and arrangement of the arms L and M, the toothed blocks N and P, and the wedges or keys O and R with the beams B and A, the plow-head G, and the handle I, substantially as herein described, and for the purpose set forth.

JOHN CLARRIDGE.

Witnesses:
 WM. F. McNAMARA,
 JAMES T. GRAHAM.